United States Patent [19]
Weber et al.

[11] 3,934,852
[45] Jan. 27, 1976

[54] TRAILER TONGUE JACK
[75] Inventors: Bernard R. Weber, Elm Grove; David W. Wendt, Monona, both of Wis.
[73] Assignee: Wesbar Corporation, West Bend, Wis.
[22] Filed: Aug. 11, 1975
[21] Appl. No.: 603,435

[52] U.S. Cl. ................... 254/86 R; 254/97; 74/405; 74/422
[51] Int. Cl.² ......................... B60S 9/02; B66F 3/16
[58] Field of Search ........ 254/86 R, 95, 96, 97, 6 R, 254/6 C, 12, 59, 66; 74/422, 405; 180/150.5

[56] References Cited
UNITED STATES PATENTS

| | | | |
|---|---|---|---|
| 2,131,281 | 9/1938 | Harbes | 254/86 R |
| 2,233,135 | 2/1941 | Ketel | 254/86 R |
| 3,136,527 | 6/1964 | Griffis | 254/86 R |
| 3,466,011 | 9/1969 | Hewes et al. | 254/97 |

Primary Examiner—Othell M. Simpson
Attorney, Agent, or Firm—James E. Nilles

[57] ABSTRACT

A jack for supporting and adjusting the elevation of a trailer tongue comprises a ground support post, having either a caster wheel or foot plate at its lower end, extending downwardly through a jack mechanism housing which is bolted to the trailer tongue. The post can be raised or lowered either by means of a rotatable crank extending from the housing or, alternately, after manual release of latching means in the housing and tilting of the crank, by manually sliding the post. The post has a toothed rack affixed along one side thereof. The mechanism in the housing comprises a pivotally movable support member on which a crank-driven worm and an intermeshing worm gear are rotatably mounted. The support member is spring biased and releasably latched into an upward position wherein the worm gear engages the rack (and functions as a pinion gear) and manual rotation of the crank is necessary to move the post up or down. Upon manual release of the latch, tilting of the crank moves the support member to a downward position wherein the worm gear is disengaged from the rack, whereupon the post is free to be slid manually to a desired position.

9 Claims, 8 Drawing Figures

TRAILER TONGUE JACK

BACKGROUND OF THE INVENTION

1. Field of Use

This invention relates generally to rack and pinion type jacks for supporting and adjusting the elevation of a trailer tongue. In particular, it relates to a jack wherein movement of the ground-engageable jack support post relative to the jack mechanism housing attached to the trailer tongue can be effected either by rotation of a crank or by a simple sliding motion of the support post itself.

2. Description of the Prior Art

Some prior art rack and pinion type jacks used for supporting and adjusting the elevation of the tongue of a boat trailer or the like comprise a downwardly extending support post, having either a caster wheel or foot plate at the lower end, and having a toothed rack rigidly affixed along one side and a jack mechanism housing attachable to the trailer tongue and through which the post and rack extend. In some such prior art jacks, the mechanism within the housing comprises a crank-driven rotatable pinion gear which is permanently in constant mesh with the rack on the jack post. Rotation of the crank in the appropriate direction effects raising or lowering of the jack post relative to the housing to thereby adjust the elevation of the trailer tongue.

In use, after the trailer tongue is connected to a tow vehicle for road transport purposes but before the trailer is actually towed, it is necessary to raise or retract the jack post upwardly clear of the terrain as far as possible by manually turning the crank in the appropriate direction. Then, after the trailer is towed to its destination but before it is disconnected from the tow vehicle, it is necessary to rotate the crank in the appropriate direction to extend the jack post downwardly so that its lower end contacts the ground for supporting the trailer tongue. Since the distance the post must be raised or lowered may be as much as several feet, and since the distance of post travel linearly per crank revolution is extremely small because of mechanism gear ratios and mechanical advantages involved, the task of cranking is tedious and time-consuming.

SUMMARY OF THE PRESENT INVENTION

In accordance with the invention there is provided a jack for supporting and adjusting the elevation of a trailer tongue of a boat trailer, for example, and to facilitate attachment and detachment of the trailer and a tow vehicle. The jack comprises a jack mechanism housing releasably connectable to the trailer tongue and a ground support post, castered or flatbottomed, extending downwardly through the housing. The post and housing are relatively movable for adjustment purposes either by operation of a rotatable crank extending from the housing or, alternately, after manual release of latching means in the housing and tilting of the crank, by manually sliding the post relative to the housing. The post has a toothed rack rigidly affixed to and extending vertically along one side thereof and through the housing. The housing contains a jack mechanism which comprises a pivotally movable support member on which a crank-driven helical threaded worm and an intermeshing worm gear are rotatably mounted. The pivotable support member is normally spring biased and releasably latched, by means of a spring biased latch, into one (upward) position wherein the worm gear engages the rack and functions as a pinion gear and rotation of the crank is necessary to move the post relative to the housing. Upon manual release of the latch, the pivotable support member is swingable downwardly a short distance around its pivot pin by means of the crank to another (downward) position wherein the worm gear is disengaged from the rack and wherein the post is free to be slid manually to a desired position relative to the housing.

The pivotable support member on which the worm and worm gear are rotatably mounted is pivotally connected to the housing by a pivot pin or bolt and is biased upwardly into the said one position by means of a helical tension spring connected between the support member and the housing. The latch is pivotally or oscillatably mounted on the housing by means of another pivot pin or bolt and is biased upwardly into releasable engagement with the edge of a slot in the lower side of the pivotable support member by means of a biasing spring connected between the latch and the housing.

When the latch is manually released by depression thereof, the support member is pivotally movable downwardly by moving the crank to an upright position and tilting or pressing forwardly thereon, i.e., toward the post.

Means are provided on the housing to facilitate releasable attachment of the jack to the trailer tongue and comprise outwardly extending flanges on the housing and an attachment plate which is connectable to the housing by a set of removable bolts. The trailer tongue is engaged between the flanges and the attachment plate.

The upper end of the jack post is provided with a handle to facilitate its manual extension or retraction relative to the housing when the latch is released and the worm gear is disengaged from the rack. The lower end of the jack post is provided with either a swivel-type ground engaging caster wheel or a flat foot plate.

A jack in accordance with the invention offers several advantages over prior art jacks. For example, the jack post can be extended or retracted incrementally by means of the crank when there is a load thereon, or alternately can be extended or retracted manually by a quick, simple pushing or pulling thereof, provided there is no load thereon and the latch is released and the worm gear and the rack are disengaged. Thus time-consuming and tedious cranking are eliminated. The jack also incorporates a desirable safety feature in that relative motion between the jack post and housing is not possible unless two separate steps are carried out simultaneously. Furthermore, a jack in accordance with the invention is relatively easy and economical to manufacture and is adaptable to a wide variety of uses other than in connection with trailers. Other objects and advantages of the invention will hereafter appear.

DRAWINGS

DESCRIPTION OF A PREFERRED EMBODIMENT

Figure 1:
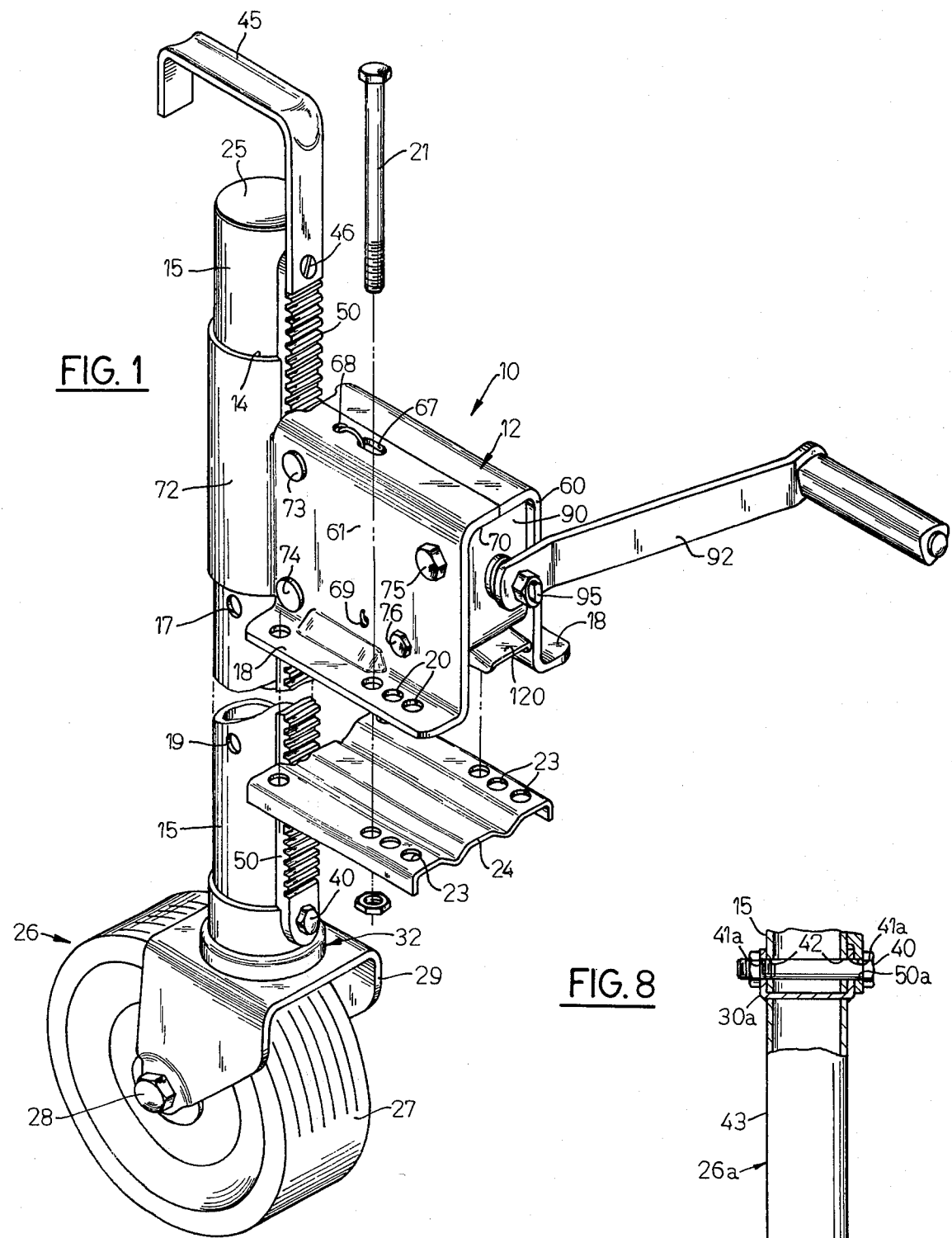
FIG. 1 is a perspective view of a jack in accordance with the invention.
Figure 2:
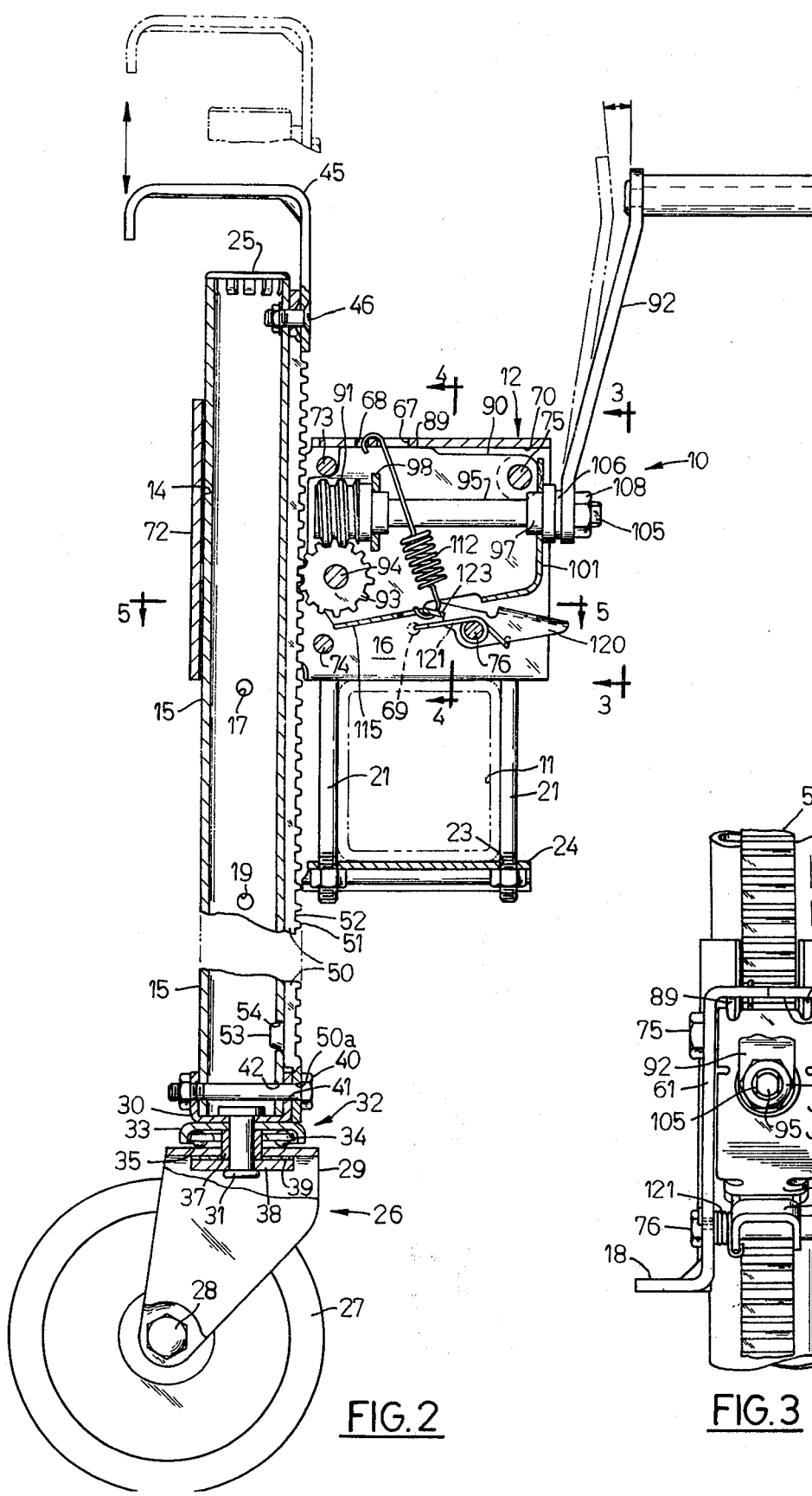
FIG. 2 is a side elevational view, partly in cross section, of the jack shown in FIG. 1.
Figure 3:
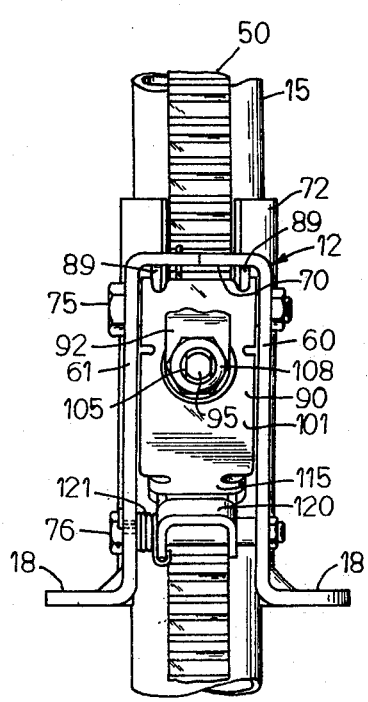
FIG. 3 is an end elevation view of the jack housing taken on line 3—3 of FIG. 2.
Figure 4:
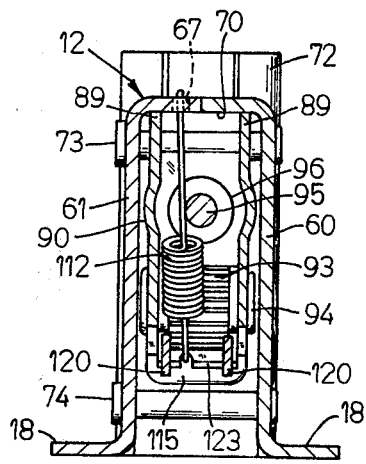
FIG. 4 is a cross section view of the jack housing taken on line 4—4 of FIG. 2.
Figure 5:
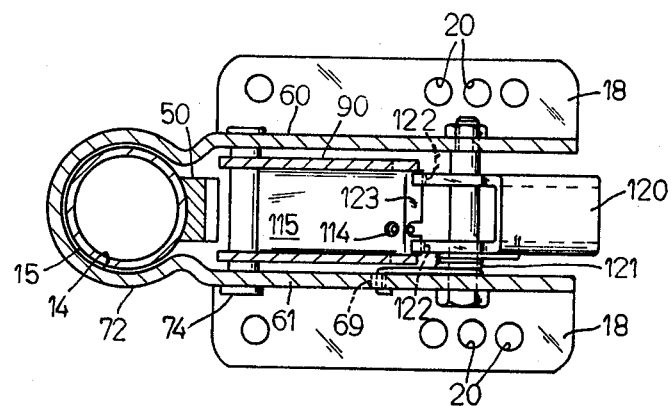
FIG. 5 is a cross section view of the post and housing taken on line 5—5 of FIG. 2.

FIGS. 1 and 2 show a jack 10 in accordance with the present invention for supporting and adjusting the elevation of a trailer tongue 11 in the form of a rigid box girder and which is understood to project forwardly from a trailer (not shown) for attachment to a tow vehicle (not shown). Jack 10 comprises a hollow rigid stamped sheet metal housing 12 bent to define a generally cylindrical vertical passage 14 through which a vertically disposed hollow cylindrical rigid support or jack post 15 extends and to define a compartment or chamber 16 wherein a jack mechanism, hereinafter described, is disposed. Housing 12 has integrally formed outwardly extending flanges 18 near the bottom thereof which are provided with bolt holes 20 for accommodating bolts 21 which extend therethrough and through registry holes 23 in a clamping plate 24. Trailer tongue 11 is rigidly clamped or secured between the housing flanges 18 and the clamping plate 24.

Jack post 15, which is closed at its upper end by a removable snap-in cap 25, is provided at its lower end with a caster assembly 26 which comprises a ground engaging caster wheel 27 which is rotatably mounted by means of an axle 28 on a caster wheel support member 29. Caster wheel support member 29 is secured for swiveling or rotation about a vertical axis to a cylindrical cap 30 by means of a rivet or bolt 31. A bearing assembly 32 comprising a bearing housing 33 and a ball bearing support plate 34 having ball bearings 35 therein is disposed between the cap 30 and the caster wheel support member 29. A bushing 37 is disposed around rivet or bolt 31 and the underside of the upper portion of the caster wheel support member 29. The caster assembly 26 is secured to the jack post 15 by means of cap 30 which fits over the lower end of the jack post and by means of a bolt 40 which extends through holes 41 in cap 30, registering holes 42 in the jack post, and hole 50a in rack 50.

Figure 8:
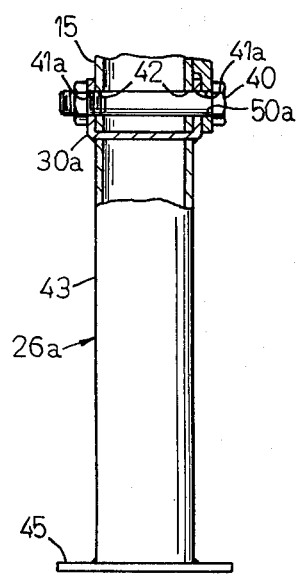
FIG. 8 is a cross section view of a portion of the jack post showing it provided with a support foot instead of a caster.

As FIG. 8 shows, instead of the caster assembly 26 shown in FIGS. 1 and 2, the lower end of jack post 15 may be provided with a support foot assembly 26a for utility purposes. Assembly 26a comprises a cylindrical cap 30a which fits over the lower end of the jack post and is secured thereto by means of bolt 40 which extends through holes 41a, hole 50a and the registering holes 42 in the jack post. A tubular member 43 is welded to and depends from cap 30a and a ground-engaging flat plate 45 is welded to the lower end of member 43.

Jack post 15 is provided at its upper end with a handle 45 which is secured thereto by means of a bolt 46 and serves as a means for manually raising or lowering the jack post relative to housing 12, as will hereinafter appear.

Jack post 15 has two vertically spaced apart holes 17 and 18 for receiving, for example, the shackle of a padlock (not shown) to prevent or discourage theft of the boat trailer. When the trailer is connected to the tow vehicle and post 15 is raised, hole 18 is above housing 12 and the lock shackle would prevent descent of the post, thereby making it extremely difficult to detach the trailer from the tow vehicle. When post 15 is lowered and the trailer is disconnected from the tow vehicle, hole 17 is below housing 12 and the lock shackle prevents raising of post 15, thereby making it difficult or impossible to tow the trailer away by means of another vehicle.

Jack post 15 is provided on the side thereof facing the jack mechanism with an elongated rack 50 having teeth 51 and grooves 52 which is secured to the jack post by means of the bolts 40 and 46. The teeth 51 and grooves 52 are at a slight angle from horizontal so as to mesh properly with the angled teeth of worm gear 93. Rack 50 is provided on its lower rear side with an integrally formed projection 53 which extends through a hole 54 in the lower end of jack post 15 and serves to aid in transferring load forces imposed on the rack 50 directly to the lower end of the jack post.

The post 15 and its attached rack 50 extend vertically through passage 14 in housing 12. As FIGS. 1 through 5 make clear, housing 12 is formed from a single metal member which is folded or bent to provide two housing sections or sides 60 and 61 which are mirror images of each other, except for spring-anchoring holes 67, 68 and 69 provided in housing section 61. Each housing section 60 and 61 is generally flat and provided with an inwardly facing flange 70 at its upper side and the aforementioned outwardly facing lower flange 18 at its lower side. The two housing sections 60 and 61 are joined together by an intermediate portion 72 defining passage 14 and are mechanically secured to each other by a pair of rivets or bolts 73 and 74 and by two bolts 75 and 76. The bolt 75 and the bolt 76 also serve as pivot pins.

The housing 12 contains or encloses a jack operating mechanism comprising a pivotably movable support member 90 on which a worm 91 driven by a crank 92, and an intermeshing worm gear 93 are rotatably mounted. Worm gear 93 is rotatable on shaft 94 which, in turn, is rigidly secured to plate 90. Worm 91 is secured to, and rotatable with, the innermost end of a rotatable shaft 95 to which crank 92 is rigidly secured at its outermost end. Worm 91, which is keyed to shaft 95 by a key 91a and also press fit thereon, is preferably formed of copper, furnace-brazed, heat-treated for strength and carborized for wearability. The shaft 95 is journalled for rotation in bushings 96 and 97. Bushing 96 is press-fitted in a hole in a bracket 98 which is rigidly secured by a snap-in arrangement in slots 99 provided in the sides of member 90. Bushing 97 is press-fitted in a hole 100 provided in the vertical end plate 101 of member 90. The end of crank 92 is provided with a hole 103 through which the threaded end of shaft 95 extends. The threaded end of shaft 95 is provided with flats 105 to enable non-rotational connection thereof to crank 92 so that crank rotation effects rotation of shaft 95. A washer 106 is disposed between bushing 97 and crank 92. A nut 108 screws onto the threaded end of shaft 95 to secure the crank 92 in its proper position and to hold the bushings 96 and 97 against their respective supporting members 98 and 101 to thereby ensure that axial movement of shaft 95 is prevented as it is rotated in either direction and so that worm 91 and worm gear 93 always remain in correct alignment.

Figure 7:
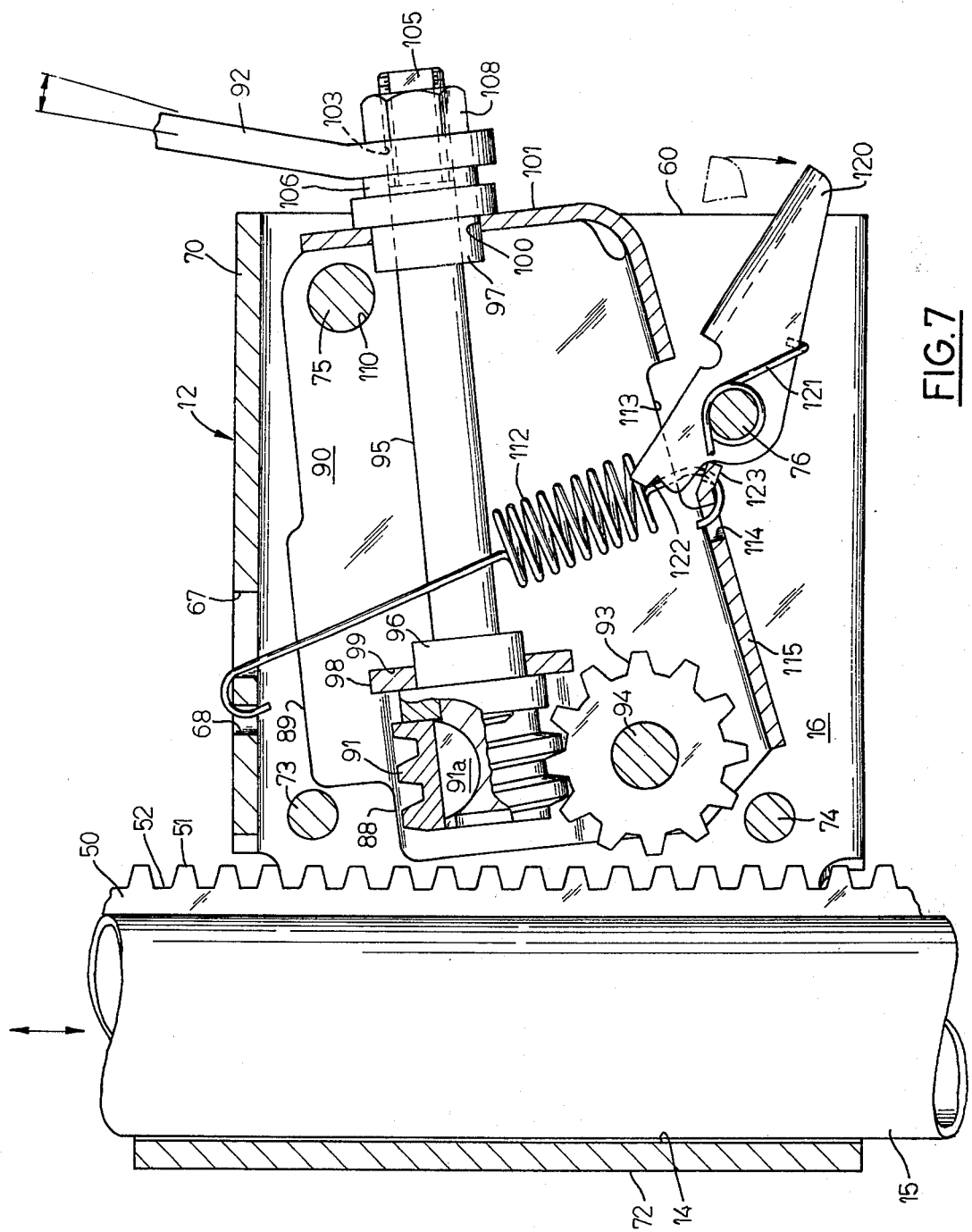
FIG. 7 is an enlarged cross section view of the housing and the operating mechanism therewithin showing components thereof moved to an alternate released position.

Pivotable support member 90 is provided with a pair of holes 110 for accommodating the bolt 75 about which member 90 can pivot between its one uppermost or engaged position, shown in FIG. 2, and its other unlatched lower position, shown in FIG. 7. Member 90 is biased into the said one position by means of a biasing spring 112 which has one end engaged in the holes 67 and 68 in housing section 61 and has its other end engaged through a slot 113 and a hole 114 in the lower portion 115 of member 90. Spring 112 is a helical tension spring which tends to bias member 90 upwardly into the position shown in FIG. 2 wherein the worm gear 93 is engaged with the rack 50.

Releasable latching means are provided to lock or latch member 90 in the position shown in FIG. 2. Such latching means take the form of a latch member 120 which is pivotally mounted on the bolt 76 hereinbefore described. A biasing spring 121 is disposed on bolt 76 and has one end engaged with the lower edge of latch 120 and has its other end secured in hole 69 in housing section 61. Spring 121 tends to bias latch 120 in a counterclockwise direction (with respect to FIGS. 2 and 7) into a position wherein a notch 122 at the end of the latch engages a downwardly sloped projection 123 in lower portion 115 of member 90. The slot 113 in member 90 affords clearance for movement and positioning of latch 120. As FIG. 2 shows, when the latch 120 is engaged with projection 123, the member 90 is in its uppermost position (being biased there by spring 112) and the worm gear 93 is in engagement with the teeth and notches on rack 50. If crank 92 is then rotated, worm 91 correspondingly rotates to effect rotation of worm gear 93 and the jack post 15 is moved upwardly or downwardly, relative to housing 12, depending upon the direction of rotation of crank 92. If post 15 has its caster wheel 27 resting on the ground, then trailer tongue 11 will be moved upwardly or downwardly along with housing 12.

If it is desired to raise or lower post 15 with respect to housing 12, as when the coupling on the end of trailer tongue 11 is securely fastened to a towing vehicle and there is no danger of the trailer tongue 11 falling, the following procedure is carried out. The latch 120 is depressed against the bias of spring 121 and moved from the latched position shown in phantom lines in FIG. 7 clockwise to its unlatched lower position shown in solid lines in FIG. 7. When this occurs, notch 122 of latch 120 disengages from projection 123 on member 90 as the notch 122 moves upwardly. However, member 90 still remains in the position shown in FIG. 2 due to the biasing action of the spring 112, and the worm gear 93 remains fully engaged with the rack 50 on post 15. To effect disengagement of the worm gear 93 from rack 50 it is necessary, for example, to rotate crank 92 to its uppermost position, as shown in solid lines in FIG. 2, and then to move or tilt the crank leftward (with respect to FIG. 2) to the position shown in the phantom lines in FIG. 2 and in solid lines in FIG. 7. Such motion of crank 92 effects counterclockwise or downward tilting of member 90, and worm gear 93 moves out of engagement with rack 50. The post 15 is then ready to be moved upwardly or downwardly, as by means of its handle 45, to a desired position wherein it can be positively maintained by releasing the pressure on crank 92, thereby allowing biasing spring 112 to move member 90 clockwise (with respect to FIG. 7) and cause re-engagement of the worm gear 93 and the rack 50. When manual pressure on the latch 120 is released, the biasing spring 121 causes the latch to move counterclockwise (with respect to FIG. 7) so that its notch 122 re-engages the projection 123 on member 90 thereby positively relatching member 90 in its uppermost position, shown in FIG. 2. It is to be understood that when member 90 is in its uppermost position and worm gear 93 is engaged with both worm 91 and rack 50, a downward load acting on the jack housing cannot effect rotation of the worm gear 93 or the worm 91 because of the gear ratios and mechanical advantages involved. Jack slippage is prevented by this self-locking design.

As is apparent from the foregoing description, the various elements in the housing 12 are normally biased by spring 112 and normally latched by latch 120 into a position wherein the worm gear 93 engages the rack 50 and wherein it is necessary to rotate crank 92 in the appropriate direction to effect corresponding vertical movement of post assembly 12. In order to free post 15 for manual sliding movement upwardly or downwardly it is necessary to perform two separate acts, namely, manual release of latch 120 and subsequently inward movement of crank 92 to cause slight downward pivotal movement of member 90 and the components mounted thereon. Unless positive pressure is applied to crank 92 and latch 120 the worm gear 93 always remains in positive engagement with the rack 50.

Figure 6:
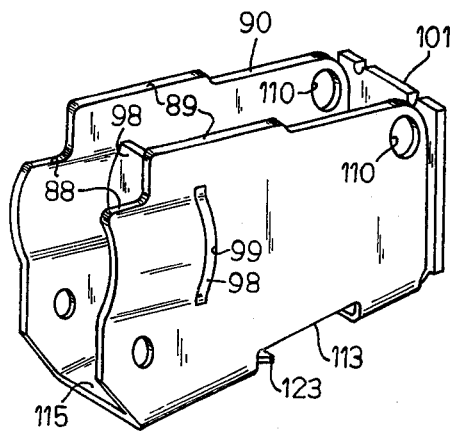
FIG. 6 is a perspective view of the pivotably movable member shown removed from the housing.

As FIGS. 2, 6 and 7 best show, member 90 is provided on its upper sides with projections 89 which engage the undersurface of the upper side of housing 12 and limit upward pivotal movement or travel of member 90 and thereby ensure that worm gear 93 and rack 50 are properly meshed. The cut-outs 88 at the ends of the projections 89 afford clearnace for the rivet 73.

I claim:

1. In a jack: an elongated post having a rack along a side thereof; a housing through which said post member extends; a member pivotally mounted on said housing and selectively movable between two positions; a gear rotatably mounted on said member, said gear being in meshed engagement with said rack on said post when said member is in one of said two positions and said gear being out of meshed engagement with said rack on said post when said member is in the other of said two positions; and means mounted on said member for selectively rotating said gear in opposite directions to move said post axially with respect to said housing when said member is in said one position and said gear and rack are engaged.

2. A jack according to claim 1 including means on said housing for releasably mounting said member in said one position.

3. A jack according to claim 2 wherein said means for releasably mounting said member in said one position is a biasing spring connected between said housing and said member.

4. A jack according to claim 2 wherein said means for releasably mounting said member in said one position is a latch connected between said housing and said member.

5. A jack according to claim 4 wherein said latch is movably mounted on said housing and selectively engageable with said member.

6. A jack according to claim 5 including a biasing spring for mounting said latch in engagement with said member.

7. A jack according to claim 6 including a biasing spring connected between said housing and said member for mounting said member in said one position.

8. A jack according to claim 7 wherein said gear is a worm gear.

9. A jack according to claim 8 wherein said means for selectively rotating said worm gear comprises a worm rotatably mounted on said member and in meshing engagement with said worm gear and a crank for rotating said worm, said crank extending outwardly of said housing.

* * * * *